Patented Aug. 29, 1933

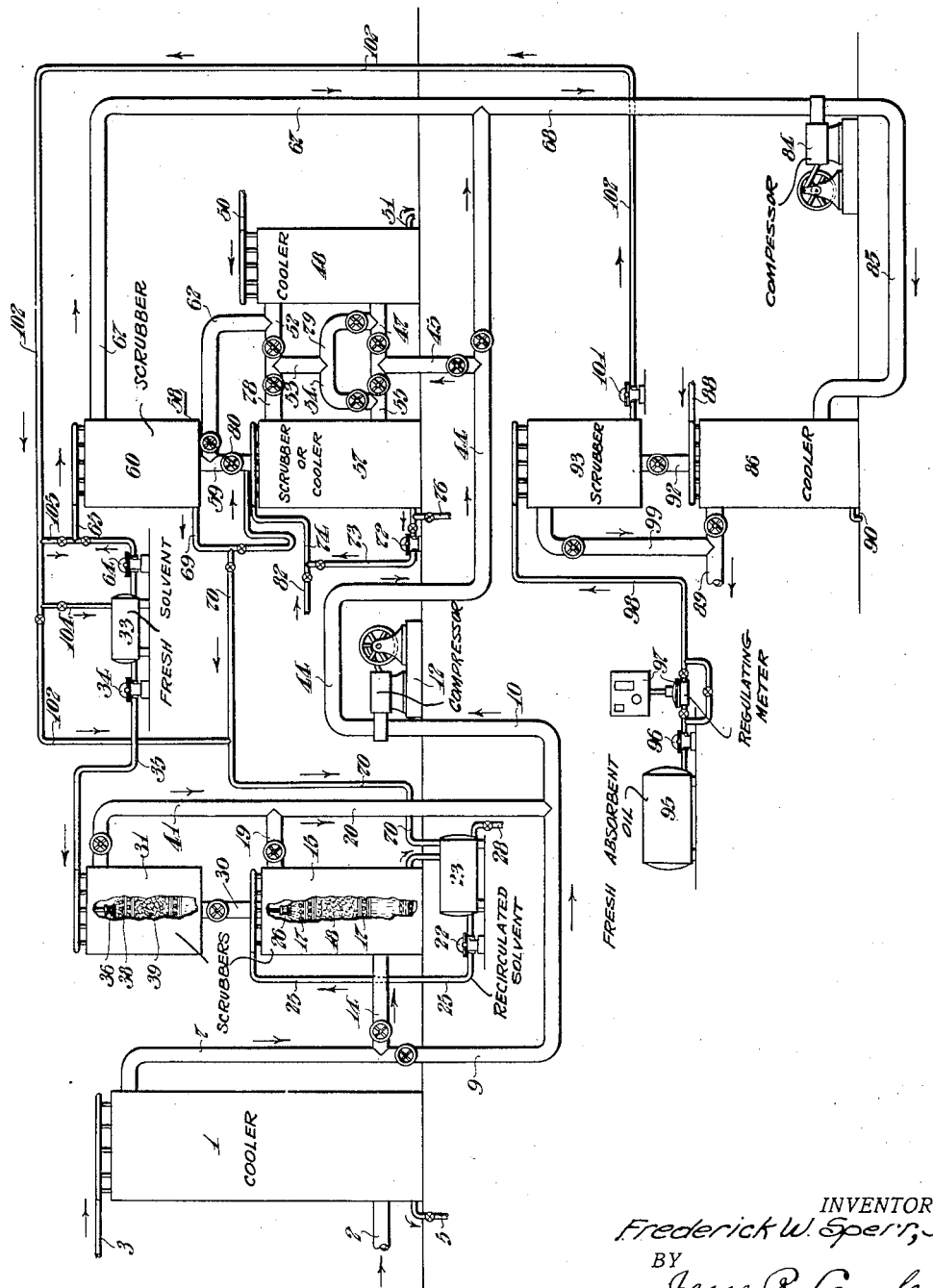

1,924,813

UNITED STATES PATENT OFFICE 1,924,813

TREATMENT OF FUEL GAS

Frederick W. Sperr, Jr., Phoenix, Ariz., assignor to The Koppers Company of Delaware, a corporation of Delaware Application April 21, 1931. Serial No. 531,725

4 Claims. (Cl. 183—114.6)

My invention relates to the removal of benzenoid compounds from fuel gases such as coke oven gas, water gas, coal gas, mixed gas, and the like, and especially to the removal of naphthalene and gum-forming constituents from such gases.

Fuel gas, as ordinarily manufactured, may contain from 15 grains to as high as 40 or 50 grains of naphthalene per hundred cubic feet, depending upon the temperatures and means of condensation. It is usually necessary to reduce this naphthalene content to about 2 or 3 grains per hundred prior to distribution of the gas to prevent deposition of solid naphthalene in the distributing system. The deposition of naphthalene is usually brought about by low temperatures in the distributing system and the troublesome and sometimes dangerous results of such deposition have long been recognized.

In addition to naphthalene, there are other troublesome benzenoid compounds in manufactured gas. Particularly troublesome are the gum-forming constituents, of which indene and styrene are typical examples. These constituents resemble naphthalene in that they are present in the gas as vapor at temperatures far below their boiling points. However, fuel gases generally have a greater carrying capacity for these compounds than for naphthalene, due to their higher vapor pressures at temperatures ordinarily encountered in gas distribution.

When the indene, styrene, etc., are condensed from the gas in the distributing system, they polymerize into sticky resinous deposits that eventually build up sufficiently to cause stoppages of orifices in governors, regulators and other appliances, and to cause other serious inconveniences.

Due to the above-mentioned high vapor pressure of the gum-forming constituents they are seldom condensed from dry gas alone. Deposition of these materials most frequently occurs from wet gases such as carburetted water gas with a high condensible oil content. When this oil is condensed, as by low temperatures encountered in the distributing system, there results a scrubbing of the gas which removes gum-forming constituents. These constituents then are in the liquid phase, of which the condensed oil or drip oil is the nucleus, and are readily polymerized into the troublesome deposits mentioned hereinabove.

Naphthalene stoppages, on the other hand, most frequently occur when dry gases are distributed, as the oil condensed from wet gases tends to keep deposited naphthalene in solution so that it may be removed with the drip oil. However, when the gases are distributed under the usual pressures only slightly above atmospheric, naphthalene removal is easily accomplished by scrubbing at similar pressures with comparatively small quantities of fresh oil. A suitable process for accomplishing this has been described in my U. S. Patent No. 1,578,687.

In some cases, however, and these are becoming more frequent, gas is compressed to relatively high pressures of 5 to 30 atmospheres and is pumped long distances before distribution to the consumer. This compression of the gas before transmission and/or distribution has a definite and very undesirable effect on the removal of benzenoid compounds by the ordinary methods of low pressure scrubbing.

While the concentration of naphthalene in the gas is proportional to the absolute pressure until the saturation point of the gas is reached, the vapor pressure of solid naphthalene is dependent only on temperature and is independent of the total gas pressure. Consequently, the naphthalene content of gas for distribution under high pressure must be reduced to a much lower percentage by weight than when distribution under substantially atmospheric pressure is practiced, if deposition at cool points in the distributing system is to be avoided.

Compression has a similarly detrimental effect on the results of removing gum-forming constituents at low pressure, but the effect is accentuated by the higher vapor pressures of these compounds. Furthermore, compression of gas leads to a new type of gum trouble to which even characteristically dry gases are subject, and which does not occur when gas is distributed under the usual low pressures.

When compressed gas is suddenly expanded, as by passing it through an orifice, or is otherwise subjected to sudden cooling, any condensible oils present are condensed into a mist or smoke which contains at least a portion of the gum-forming constituents present and keeps them in a readily polymerizable condition. This gummy mist deposits on surfaces with which it comes in contact and is thus the cause of stoppages and other troubles similar to those resulting from the distribution of wet gas.

It is evident that compression of gas prior to transmission or distribution leads to problems not encountered when gas is distributed under substantially atmospheric pressure, and furthermore that the benefits obtained by the ordinary methods of scrubbing naphthalene and other benzenoid constituents from gas at low pressure are to a large extent nullified by subsequent compression of the gas.

An object of my present invention is to provide a process of treating fuel gas to be distributed under pressures substantially above atmospheric to prevent the deposition of benzenoid compounds from the gas during the distribution thereof.

A second object of my invention is to provide an economical process of removing naphthalene and gum-forming constituents from fuel gases to be distributed under pressures substantially above atmospheric, and suitable apparatus therefor.

A further object of my invention is to provide a process of removing benzenoid constituents from fuel gas at an intermediate stage of the compression of the gas which precedes distribution at pressures substantially above atmospheric.

My invention has for further objects such other operative advantages and results as may hereinafter be found to obtain.

When fuel gas is transmitted or distributed at pressures above 4 or 5 atmospheres, the compression is usually accomplished in two or more stages for economic reasons. For example, gas might be compressed to 15 atmospheres in two stages, the first stage taking the compression up to about 4 atmospheres and the second stage completing the compression to 15 atmospheres. If a final or distributing pressure of 30 atmospheres is desired, compression might be in three stages of 1 to 4, 4 to 12, and 12 to 30 atmospheres, respectively.

As stated hereinabove, the effect of removing naphthalene and gum-forming constituents at ordinary pressures is largely nullified if the gas is subsequently compressed before distribution. For example, if fuel gas at substantially atmospheric pressure is scrubbed with oil or otherwise treated so that the naphthalene content is reduced to about two grains per 100 cu. ft. and the content of gum-forming constituents is reduced to 10 grains per 100 cu. ft., and the gas is then compressed to 10 atmospheres, the gas enters the distributing system containing approximately 20 grains of naphthalene and 100 grains of gum-forming constituents per 100 cu. ft. As the vapor pressure of these benzenoid compounds is dependent only upon the temperature of the gas, troublesome deposits of naphthalene and gums or resins are almost certain to form in cooler parts of the distributing system, and when the gas is suddenly expanded through orifices, etc.

In removing naphthalene and analogous benzenoid constituents from fuel gas, it is desirable that the quantity of fresh scrubbing oil used be kept at the absolute minimum to prevent the simultaneous removal of light oils and similar valuable constituents from the gas. It is usually preferable for this reason to use not more than 10 to 20 gallons of fresh oil per million cu. ft., for example, in removing naphthalene and the like by means of my process referred to hereinabove.

Because of this limitation as to the amount of fresh absorbent used, it is not ordinarily feasible to reduce the naphthalene content of gas from 20 to 30 grains per 100 cu. ft.—which is the usual content of gas at substantially atmospheric temperature and pressure—to less than about 1 or 2 grains per 100 cu. ft. When such gas is compressed, its naphthalene content is increased usually to a point beyond the saturation limit at the temperatures encountered during distribution, and it thereby becomes subject to the troublesome consequences of naphthalene deposition referred to hereinabove.

One means of overcoming this difficulty is to scrub the benzenoid compounds from the gas after compression, thus taking advantage of the increased vapor pressure of these compounds resulting from the concentration caused by compression of the gas to facilitate their removal. I have found, however, that definite advantages result from treating the gas for removal of benzenoid compounds, as by scrubbing with oil, if the treatment is effected at one or more of the intermediate pressures, such as 4 and/or 12 atmospheres in the examples given above.

I thus take advantage of the increased concentration of these compounds brought about by partial compression to assist in their removal from the gas. I am also able to thereby effect a considerable saving in the cost of construction and operation of my apparatus because it does not have to withstand the strain of the final highest pressure, and I can obtain satisfactorily complete removal of benzenoids without using more than the allowable amount of fresh absorbent.

Furthermore, since another stage of compression follows my treatment of the gas, when proper solvents are used for scrubbing at the intermediate pressure the subsequent compression and after-cooling assist in obtaining very complete removal of the benzenoid compounds.

Treatment of the gas before the final stage of compression according to my invention may be effected in any suitable type of apparatus such as the various scrubbers used to remove naphthalene at ordinary pressures. I have found, for example, that a scrubber similar to that described in my above-mentioned patent is well adapted to this use.

This scrubber consists of two sections. In the lower section, the gas is contacted with a recirculated absorbent, such as a suitable oil, and in the upper section or "shot section" treatment is completed by means of a comparatively small amount of substantially fresh solvent which is preferably supplied intermittently. The fresh oil, after contact with the gas in the shot section, is generally combined with the recirculated oil in the lower section.

When the gas is scrubbed for the removal of benzenoid compounds after more than one stage of compression, the scrubbers may consist of only one section, which may be either a recirculating section or preferably a shot section. Also, when the gas is subjected to a preliminary scrubbing at low pressure to remove a portion of the benzenoids before the first stage of compression, the shot section may be and preferably is omitted from the preliminary scrubber.

The gas is cooled to approximately atmospheric temperature before the first stage of compression, and this cooling precedes the preliminary scrubbing when such scrubbing is practiced. The gas is also cooled to remove the heat of compression by inter-coolers or after-coolers following each stage of compression. This intercooling may be effected before the gas is scrubbed to remove benzenoids, or, when a two-section scrubber is used, after the gas passes through the recirculating section and before it enters the shot section.

Any suitable solvent or absorbent for benzenoid compounds, such as those ordinarily used for removal of naphthalene from fuel gas, may be used in the practice of my invention. Gas oil, straw oil, certain tar fractions, tetraline and other similar compounds are examples of suitable solvents for my purpose. However, I have found that particularly desirable results are obtained if a heavy oil of very low vapor pressure, such as absorbent oil or wash oil, is used in at least the last stage in which the gas under treatment is contacted with solvent.

The benefits derived from final treatment of the gas with an absorbent oil having a low vapor pressure have been described in a copending application of A. R. Powell, Serial No. 474,738, filed August 12, 1930. However, my invention is not limited to the use of lighter oils and solvents in the earlier stage or stages of scrubbing followed by a final treatment with a heavy solvent, as either type of solvent may be used in all stages of scrubbing, if desired.

With the objects set forth above and other objects in view, I now describe with reference to the accompanying drawing a preferred method of practicing my improved process of removing benzenoid compounds from fuel gases. In the drawing, The single figure is a somewhat diagrammatic elevational view, with parts broken away, of apparatus suitable for the practice of my present invention.

Fuel gas, such as coke oven gas or the like, which has preferably been previously freed from tar, ammonia, etc., in the usual manner, enters a cooler 1 through a pipe 2. The cooler may be of the direct or indirect type, but is preferably of the direct type, and gas is cooled therein by intimate contact with cooling water or liquor supplied at a temperature near or below atmospheric through a pipe 3. If the gas has not been previously freed of hydrogen sulphide, the cooler 1 may be a combined final cooler and H₂S absorber.

The gas passes upwardly from pipe 2 through wooden hurdles or other suitable contact media with which the interior of the cooler 1 is packed, and is cooled to substantially atmospheric temperature by the countercurrent of cooling liquor descending through the packing. Constituents of the gas which are condensible at this temperature are removed, and collect with the cooling water in a sump near the bottom of the cooler. From this sump the liquor and condensate are withdrawn through a pipe 5 for recirculation or other disposal.

The gas at substantially atmospheric temperature and pressure and containing, for example, 20 to 30 grains of naphthalene and a similar quantity of gum-forming constituents per 100 cubic feet, passes from the cooler 1 through a pipe 7. If it is not desired to subject the gas to a preliminary scrubbing for the partial removal of benzenoid constituents before compression, the gas continues directly through pipe 9 and a pipe or main 10 to a compressor 12.

When it is desired to remove part of the benzenoid compounds from the gas before compression, the gas is passed from pipe 7 through a pipe 14 into a scrubber 15. The gas passes upwardly through contact material, such as wooden hurdles 17, and/or steel lathe turnings 18 with which the interior of the scrubber is packed, and is brought into intimate contact with a countercurrent flow of recirculated solvent, such as gas oil, which removes a portion of the benzenoid constituents from the gas. The gas then passes from the scrubber 15 through pipes 19 and 20 into the main 10.

The scrubbing oil or other solvent is recirculated over the scrubber 15 by a pump 22, which withdraws it from a tank 23 or other suitable storage means and delivers it through a pipe 25 and suitable distributing devices, such as sprays 26, onto the packing. After passing downwardly through the packing and absorbing benzenoid constituents from the gas, the solvent collects near the bottom of the scrubber and flows to the tank 23 for recirculation.

Solvent contaminated with constituents removed from the gas is withdrawn from the tank 23 through a pipe 28. If desired, tank 23 may be omitted, and recirculation and discharge of solvent then take place from a sump in or near the button of the scrubber 15.

In some instances it may be desirable to subject the gas leaving the scrubber 15 to a further scrubbing with substantially fresh solvent. This is conveniently accomplished by means of a two-section scrubber, in which a fresh solvent section or shot section is superposed upon a recirculated solvent section, similar to scrubber 15. The gas then passes from the top of the scrubber 15 through a pipe 30 into a fresh solvent section 31, wherein a further quantity of benzenoid constituents is removed from the gas.

Fresh solvent is withdrawn from a tank 33 by a pump 34 and delivered preferably intermittently through a pipe 35 and sprays 36 to the shot section 31 of the scrubber. The gas passes upwardly through the contact material such as wooden hurdles 38 and/or lathe turnings 39 with which this section of the scrubber is packed, and passes from the scrubber through a pipe 41 into pipe 20.

The packing holds the fresh solvent in the path of the gas, which, by contact with the solvent, is freed of naphthalene down to about 2 or 3 grains or less, per 100 cu. ft., and partially freed of other benzenoid compounds. The solvent from the shot section 31 then continues down through pipe 30 into the lower section 15 and is mixed with the recirculated solvent below the sprays 26.

If desired, a storage holder or relief holder may be provided, into which gas passes from pipe 10 on its way to the compressor 12. When gas is produced and supplied to the compressor at a sufficiently uniform rate, however, the holder may be omitted and the gas then passes from pipe 10 directly into the compressor, as in the present case.

In the compressor 12, the pressure of the gas may be increased, for example, from one atmosphere to about 4 atmospheres as the first stage of compression. The gas then passes through pipes 44 and 45 to an after-cooler or intercooler in which the heat of compression is removed, and to a scrubber for the removal of benzenoid compounds at this intermediate stage of compression.

The sequence in which the gas is cooled and scrubbed, and also the most suitable type of apparatus to use, depend upon the composition and previous treatment of the gas. For instance, if the gas does not receive a preliminary scrubbing, it may contain 20 to 30 grains of naphthalene per 100 cu. ft. before compression, and 80 to 100 grains or more afterwards. This can be reduced to approximately 20 grains by cooling the compressed gas to substantially atmospheric temperature, as in a cooler of the direct type. The load on the intermediate scrubber is thereby greatly reduced, and a scrubber of either one or two sections may then be used with satisfactory results.

On the other hand, if the gas receives a thorough preliminary scrubbing before compression and therefore contains a relatively small amount of naphthalene and analogous compounds after the first stage of compression, it is preferable to cool the gas and pass it into a one section scrubber for removal of benzenoid compounds. In other cases it may be preferable to first pass the gas through a scrubber in which it is treated with recirculated solvent, and then to cool the gas and pass it through a fresh solvent scrubber of the intermittent type.

When cooling of the gas is practiced before the intermediate scrubbing, the gas passes from pipe 45 through a pipe 47 into an after-cooler or intercooler 48. This cooler is supplied with cooling water or liquor through a pipe 50. The cooling water passes downwardly through the cooler in intimate contact with the gas, and is discharged from the bottom of the cooler through a pipe 51 for recirculation or other disposal. The gas passes from the top of the cooler at approximately atmospheric temperature through a pipe 52.

The cooled gas is then scrubbed with oil or other solvent for benzenoid constituents in either one or two stages. If two stages of scrubbing are employed, the gas passes from pipe 52 through pipes 53, 54 and 55 or other suitable connecting means into a lower section 57 of a two-section scrubber 58. After being scrubbed with recirculating solvent in this lower section 57 of the scrubber, the gas passes upwardly through a pipe 59 into an upper section or shot section 60.

If only one stage of scrubbing for removal of benzenoid constituents is employed, the gas passes from pipe 52 through a pipe 62 into pipe 59 and the shot section 60. In any case when the shot section 60 is used, fresh solvent is preferably supplied thereto intermittently, as by a pump 64 which withdraws it from tank 33 and delivers it through pipe 65, or by other suitable means. This solvent removes benzenoid constituents from the gas, which then passes on through a pipe 67 into pipe 68.

When the two-stage scrubber 58 is used for removal of benzenoid constituents, the oil from the shot section 60 may pass down through pipe 59 into the lower section 57, where it mixes with the recirculated oil. Alternatively, the oil may be collected in a well or sump at the bottom of the shot section, and withdrawn therefrom through a pipe 69, by which it is returned to the lower section. When this lower section is not used for scrubbing, or if for other reasons it is desirable to dispose of the oil from the shot section elsewhere, it may be passed from pipe 69 through pipe 70 into the tank 23 or some other suitable part of the preliminary scrubbing system.

Solvent is recirculated over the lower section 57 of the scrubber by a pump 72, which withdraws solvent from the bottom of the scrubber and returns it to the top thereof through pipes 73 and 74. The recirculated solvent is mixed with relatively fresh solvent from the shot section when that section is in use. The combined solvent, containing benzenoid constituents removed from the gas, collects at the bottom of this section of the scrubber, and excess solvent may be withdrawn through a pipe 76 for disposal.

When it is desired to scrub the gas in the recirculating section before cooling, the gas passes from pipe 45 through pipe 55 into the lower or recirculating section 57 of the scrubber 58. The gas leaves this section of the scrubber through pipe 78 and passes through pipes 53, 79 and 47 or other suitable connecting means into the cooler 48. From the cooler, the gas passes through pipes 52 and 62 into the pipe 59 at a point above valve 80, which is closed, then through the shot section 60 of the scrubber, and out through pipe 67 as before.

Operation of the cooler 48 and/or of the lower section 57 of the scrubber 58 may be carried on without simultaneous use of the shot section, if desired. In that case the supply of fresh solvent to the shot section is discontinued, or that section of the scrubber may be omitted entirely. Pipe 59 is then connected directly to pipe 67, or some other suitable passage for the gas is provided.

In a preferred process of cooling and scrubbing the gas at intermediate pressures, only one stage of scrubbing is employed, and this stage is preferably of the intermittent or shot type. An especially desirable type of apparatus for this purpose consists of a two section tower similar to the scrubber 58, with the lower section constituting a cooler which replaces the cooler 48. Pump 72 and pipe 73 may then be omitted, and cooling water is supplied through a pipe 82 to pipe 74, which delivers it into the cooling section 57 of the tower. The interior of the tower is preferably packed with suitable contact material, such as wooden hurdles, spiral tile, or the like, as in the previous case.

The cooling liquor passes downwardly through the contact material in intimate contact with the countercurrent of gas which enters this cooling section 57 from pipe 55. The temperature of the gas is thereby reduced to substantially that of the atmosphere, or less, and naphthalene and other benzenoids are condensed under some conditions, as stated hereinabove. The cooling liquor is withdrawn from the bottom of the tower through a pipe 76 for recirculation or other disposal, and the cooled gas continues upward through pipe 59 into the shot section 60 for treatment with substantially fresh solvent as previously described. The cooler 48 and the connections thereto are omitted.

The cooling section 57 of the tower 58, or the cooler 48 when used, may be of the indirect type instead of the direct type described. In some cases it may be desirable to substitute refrigerating brine for the cooling water, and a cooler of the indirect type is then usually preferable.

After the scrubbing and cooling which follow the first stage of compression are completed, the gas under an intermediate pressure, such as 4 atmospheres, passes through pipe 68 into a compressor 84. In this compressor it undergoes the second stage of compression, which may or may not be the final stage, to a pressure which is usually between 8 and 20 atmospheres, such as 12 or 15 atmospheres. The gas then passes from the compressor 84 through a pipe 85 for further treatment.

The nature of the treatment to which the gas is subjected after the second stage of compression depends on the quantity of undesirable benzenoid compounds remaining in the gas, and also upon whether the gas is to be further compressed, and if so, to what extent. When this second stage is the final stage of compression, the subsequent treatment is further varied according to the temperatures to which the gas is to be exposed during distribution.

In most cases, treatment of the gas after the first stage of compression, as described hereinabove, reduces the naphthalene content to about 2 grains per 100 cu. ft., and the content of other troublesome benzenoid constituents to a correspondingly low figure. After the second stage of compression, the benzenoid content of this gas is multiplied by a factor approximately equal to the compression ratio, which is from 2 to 5 in the examples given. This results in a naphthalene content of 4 to 10 grains per 100 cu. ft., if removal during compression is neglected.

However, during its passage through the final section 60 of the scrubber 58 the gas becomes saturated at the temperature and pressure there prevailing with the solvent with which it is in contact. By subsequent compression in the compressor 84, followed by cooling, the gas becomes supersaturated with respect to the solvent, and solvent condenses in the form of a fine mist, which separates from the gas. This mist gives the gas an extremely thorough scrubbing, which suffices to remove a further portion of the benzenoid constituents.

Consequently, if the gas is cooled after the second stage of compression, its naphthalene content is usually less than 10 grains per 100 cu. ft. Since gas with such a naphthalene content can be distributed without trouble in many systems, except in very cold weather, cooling is frequently the only treatment to which the gas passing through pipe 85 needs to be subjected. In that case it passes from pipe 85 into a cooler 86, which is preferably similar to the coolers described hereinabove.

The compressed gas passes upwardly through this cooler 86 in intimate contact with a countercurrent of cooling water delivered to the cooler through a pipe 88, and leaves the cooler at a temperature near or below that of the atmosphere through a pipe 89. The cooling water and condensate from the gas are withdrawn from the bottom of the cooler through a pipe 90 for cooling and recirculation, or for other disposal.

The cooled, compressed gas leaves the cooler 86 through pipe 89 ready for further compression or for delivery to the distributing system. If this gas is to be further compressed, however, it may be preferable to subject it to further scrubbing, and such scrubbing is also desirable in other cases, as when low temperatures prevail in the distributing system, and when removal of benzenoid constituents following the first stage of compression has not been sufficiently complete.

Under such circumstances, a combined cooler and scrubber similar to the tower 58 described hereinabove is suitably employed. The cooler 86 forms the lower section of such a tower, and cooled gas passes upwardly from this section through a pipe 92 into a scrubbing section 93. Fresh or substantially uncontaminated solvent is withdrawn from a tank 95 by a pump 96, which may suitably be controlled by an automatic or self-regulating meter 97. The solvent is delivered preferably intermittently by the pump 96 through the meter 97 and a pipe 98 into the scrubbing section 93 of the tower.

The solvent passes downward through contact material in the scrubber 93, removing benzenoid constituents from the gas, and collects in a sump or well near the bottom of the scrubber. The treated gas passes from the scrubber through a pipe 99 into pipe 89 for delivery to the distributing system, or for further compression or other disposal.

A pump 101 withdraws solvent from the well in scrubber 93 and returns it through pipe 102 to an earlier stage in the system. This solvent may, for example, be delivered to pipe 70 through which it flows to tank 23 for recirculation over the preliminary scrubber, or it may pass from pipe 102 through pipe 104 into tank 33. As a further alternative, the solvent may be delivered from pipe 102 through pipes 105 and 65 into the scrubber 60. In this last instance, the pump is preferably controlled by a regulating meter or other suitable means of providing for intermittent operation, and the pump 65 may be omitted.

In the above description, it has been assumed that separate single stage compressors are used for each stage of compression. Entirely analogous results are obtained, however, by using one multiple stage compressor to replace the series of single stage compressors. Only simple modifications are needed to adapt the above-described process to use with a multiple stage machine.

It will be obvious to those skilled in the art that various modifications are possible in the several steps of my process and the several parts of my apparatus, in addition to those mentioned hereinabove, without departing from the spirit of my invention and it is my intention to cover in the claims such modifications as may reasonably be included within the scope thereof.

I claim as my invention:

1. The process of treating fuel gas containing benzenoid constituents which comprises cooling the gas to substantially atmospheric temperature, scrubbing the gas with a solvent for benzenoid compounds, compressing the gas, cooling the gas to remove the heat of compression, scrubbing the gas with absorbent oil to remove benzenoid constituents and to saturate the gas with absorbent oil, further compressing the gas, and then cooling the gas.

2. The process of treating fuel gas containing naphthalene and gum-forming constituents, which comprises compressing the gas to an intermediate pressure greater than the original pressure but less than the distributing pressure, scrubbing the gas at this intermediate pressure with absorbent oil having a low vapor pressure to remove naphthalene and gum-forming constituents and to at least partially saturate the gas with the solvent, compressing the gas to a pressure greater than the said intermediate pressure, and cooling the gas to remove heat of compression and to condense solvent therefrom, thereby removing a further quantity of naphthalene and gum-forming constituents.

3. The process of conditioning fuel gas containing naphthalene and gum-forming compounds for distribution under pressure, which comprises cooling the gas to substantially atmospheric temperature, recirculating through the gas a solvent for naphthalene and gum-forming compounds, compressing the gas to an intermediate pressure greater than atmospheric but less than the distributing pressure, cooling the gas to remove the heat of compression, scrubbing the gas with absorbent oil having low vapor pressure to remove a further quantity of naphthalene and gum-forming compounds and to saturate the gas with absorbent oil, compressing the gas to a higher pressure, and cooling the gas.

4. The process of conditioning fuel gas containing naphthalene and gum-forming compounds for distribution under pressure, which comprises cooling the gas to substantially atmospheric temperature, recirculating through the gas a solvent for naphthalene and gum-forming compounds, compressing the gas to an intermediate pressure greater than atmospheric but less than the distributing pressure, cooling the gas to remove the heat of compression, scrubbing the gas with absorbent oil having low vapor pressure to remove a further quantity of naphthalene and gum-forming compounds and to saturate the gas with absorbent oil, withdrawing absorbent oil from contact with the scrubbed gas, compressing the gas to a higher pressure, cooling the gas, and combining the withdrawn absorbent oil with the recirculating solvent.

FREDERICK W. SPERR, Jr.